(12) United States Patent
Smith et al.

(10) Patent No.: US 12,451,995 B2
(45) Date of Patent: *Oct. 21, 2025

(54) MULTI-LINK OPERATION WITH LOCALIZED PERFORMANCE OF B-ACK FUNCTIONS

(71) Applicant: Cisco Technology, Inc., San Jose, CA (US)

(72) Inventors: Malcolm Muir Smith, Richardson, TX (US); Brian D. Hart, Sunnyvale, CA (US); Pooya Monajemi, Irvine, CA (US); Santosh Babaji Kulkarni, San Jose, CA (US); Vishal Satyendra Desai, San Jose, CA (US)

(73) Assignee: Cisco Technology, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 19/076,115

(22) Filed: Mar. 11, 2025

(65) Prior Publication Data

US 2025/0211368 A1 Jun. 26, 2025

Related U.S. Application Data

(60) Continuation of application No. 18/058,604, filed on Nov. 23, 2022, which is a division of application No.
(Continued)

(51) Int. Cl.
*H04L 1/1607* (2023.01)
*H04W 8/12* (2009.01)
*H04W 36/22* (2009.01)

(52) U.S. Cl.
CPC .............. *H04L 1/1621* (2013.01); *H04W 8/12* (2013.01); *H04W 36/22* (2013.01)

(58) Field of Classification Search
CPC . H04W 36/18; H04W 8/12; H04W 36/00835; H04W 36/22; H04W 36/32;
(Continued)

(56) References Cited

U.S. PATENT DOCUMENTS

| 8,665,743 | B2 | 3/2014 | Zhu et al. |
| 8,934,369 | B2 | 1/2015 | Cao et al. |

(Continued)

FOREIGN PATENT DOCUMENTS

CN 106954236 A 7/2017

OTHER PUBLICATIONS

IEEE: "IEEE P802.11be™M/D0.3 Draft Standard for Information technology—Tele-communications and Information Exchange between Systems Local and Metropolitan Area Networks—Specific requirements, Part 11: Wireless LAN Medium Access Control (MAC) and Physical Layer (PHY) Specifications, Amendment 8: Enhancements for Extremely High Throughput (EHT)", IEEE P802.11be™ /D0.3, Jan. 2021, pp. 1-389.

(Continued)

*Primary Examiner* — Ricky Q Ngo
*Assistant Examiner* — Kabir U Jahangir
(74) *Attorney, Agent, or Firm* — Merchant & Gould P.C.

(57) ABSTRACT

Seamless client roaming for Multi-Link Device (MLD) clients may be provided. First, a Traffic Identifier (TID)-to-link map may be established by an Upper Service Access Point (U-SAP) of a multi-AP MLD entity that assigns subsets of TIDs to at least two links of the entity. For example, a client device logically associates with the U-SAP, while the client device physically connects to a first and second AP of the entity on a respective first and second link, where the first and second AP include first and second Lower Service Access Points (L-SAPs) and are non-collocated. Next, using the map, data received at the U-SAP is
(Continued)

directed over one of the two links for transmission to the client device. Further, frame aggregation and block acknowledgment functions may be performed by one of the first or second L-SAP based on whether data transmission is over the first or second link.

11 Claims, 10 Drawing Sheets

Related U.S. Application Data

17/144,931, filed on Jan. 8, 2021, now Pat. No. 11,553,390.

(58) Field of Classification Search
CPC ..... H04W 28/08; H04W 88/10; H04W 76/15; H04W 76/11; H04W 84/12; H04L 1/1621; H04L 1/1893; H04L 1/1614
See application file for complete search history.

(56) References Cited

U.S. PATENT DOCUMENTS

| | | |
|---|---|---|
| 9,648,464 B1 | 5/2017 | Tran et al. |
| 10,383,039 B2 | 8/2019 | Henry et al. |
| 2012/0300746 A1 | 11/2012 | Ibrahim et al. |
| 2019/0150214 A1 | 5/2019 | Zhou et al. |
| 2019/0335454 A1 | 10/2019 | Huang et al. |
| 2020/0037288 A1* | 1/2020 | Huang ............ H04W 72/30 |
| 2020/0137626 A1 | 4/2020 | Huang et al. |
| 2020/0221545 A1 | 7/2020 | Stacey et al. |
| 2021/0007168 A1 | 1/2021 | Asterjadhi et al. |
| 2021/0014911 A1 | 1/2021 | Patil et al. |
| 2021/0126947 A1 | 4/2021 | Wang |
| 2021/0211235 A1* | 7/2021 | Chu ............ H04L 1/1614 |
| 2023/0006773 A1* | 1/2023 | Dong ............ H04L 1/1685 |

OTHER PUBLICATIONS

Chu L., et al., "A-MPDU and BA," IEEE Draft, 11-19-1856-03-00BE-A-MPDU-and-BA, IEEE-SA Mentor, Nov. 6, 2019, Piscataway, NJ USA, Jan. 16, 2020, vol. 802.11 EHT, 802.11be, No. 3, pp. 1-14, [Retrieved on Jan. 16, 2020] Retrieved from URL: https://mentor.ieee.org/802.11/dcn/19/11-19-1856-03-00be-a-mpdu-and-ba.pptx.

Edward A.U., "Specification Framework For TGbe," IEEE P802.11, Wireless LANs, 19/1262r6, Nov. 27, 2019, 12 Pages.

International Search Report and Written Opinion for International Application No. PCT/US2021/065018, mailed Jun. 28, 2022, 20 Pages.

* cited by examiner

MULTI-LINK OPERATION WITH LOCALIZED PERFORMANCE OF B-ACK FUNCTIONS

CROSS-REFERENCE TO RELATED APPLICATIONS

This application is a continuation of U.S. patent application Ser. No. 18/058,064, filed Nov. 23, 2022, which is a division of U.S. patent application Ser. No. 17/144,931, filed Jan. 8, 2021, now U.S. Pat. No. 11,553,390, the disclosures of which are incorporated herein by reference in their entirety.

TECHNICAL FIELD

The present disclosure relates generally to an access point (AP) multi-link device (MLD) architecture and roaming assistance methods to enable and facilitate seamless roaming for MLD clients.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

An AP connects to a wired network, then provides Radio Frequency (RF) links for other radio devices to reach that wired network. Most APs support the connection of multiple wireless devices to one wired connection. APs are built to support a standard for sending and receiving data using these radio frequencies.

Institute of Electrical and Electronics Engineers (IEEE) 802.11be, also referred to as Wi-Fi 7, introduces a concept of a Multi-Link Device (MLD) that enables a client device to simultaneously be associated with multiple RF links on an AP, which provides increased capacity and higher throughputs for the client device.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
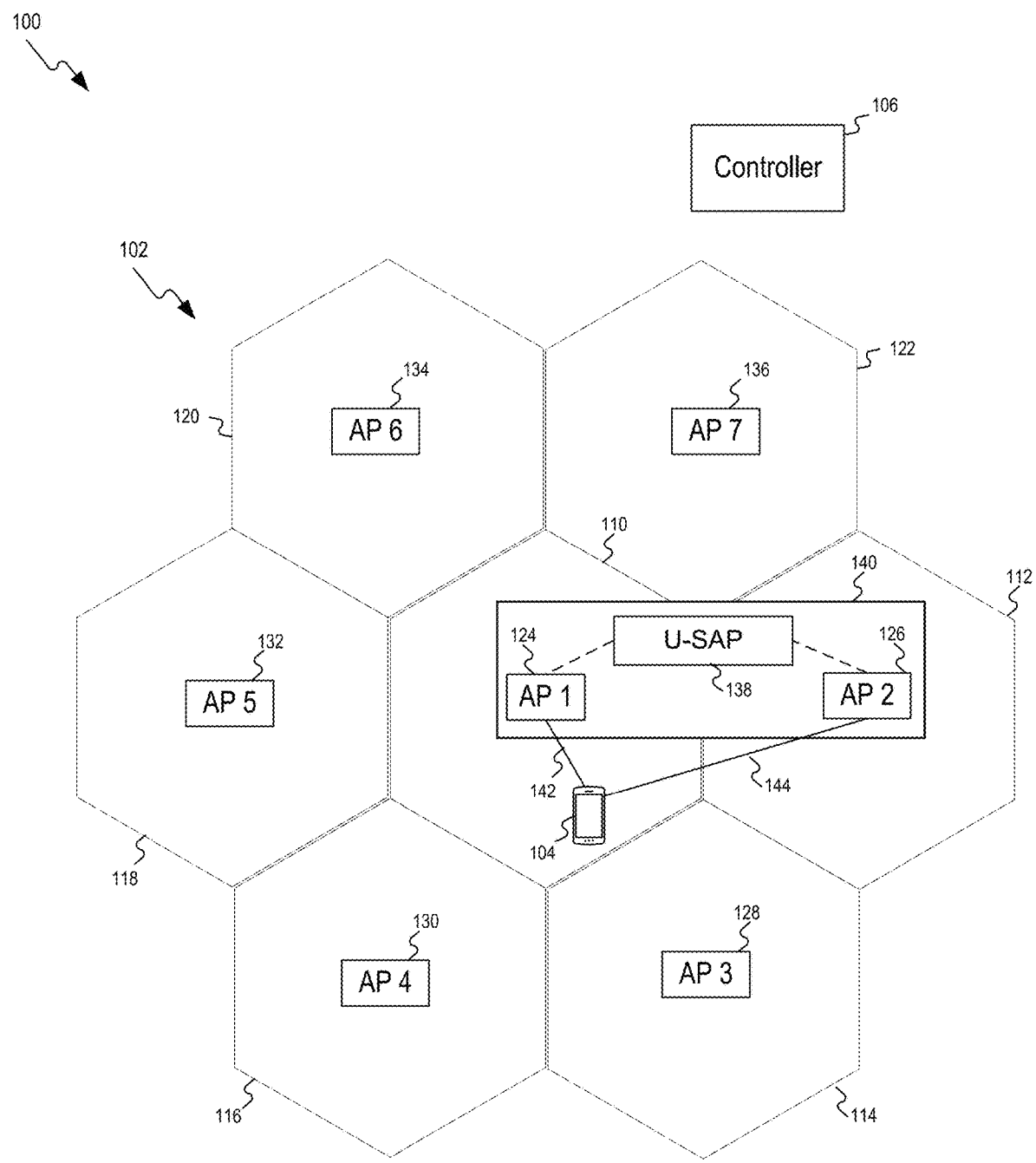
FIG. 1 is a block diagram of wireless network.

Seamless roaming for Multi-Link Device (MLD) clients may be provided. First, a Traffic Identifier (TID)-to-link map may be established by an Upper Service Access Point (U-SAP) of the multi-AP MLD entity that assigns subsets of a plurality of TIDs to at least two links of the multi-AP MLD entity. For example, a client device logically associates with the U-SAP of the multi-AP MLD entity to connect to a network, while client device physically connects to at least a first AP and a second AP of the multi-AP MLD entity on a respective first link and second link of the at least two links, where the first and second AP include a respective first and second Lower Service Access Point (L-SAP) and are non-collocated in the network. Next, using the TID-to-link map, data received at the U-SAP may be directed over one of the at least two links for transmission to the client device. Further, based on whether the data transmission is over the first link or the second link, the respective first L-SAP or the second L-SAP may perform frame aggregation and Block Acknowledgment (B-ACK) functions.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

With the emergence of dual-radio client devices and tri-band Access Points (APs) capable of simultaneously operating at 2.4 GHz, 5 GHz, and 6 GHz Radio Frequency (RF) bands, one of the main objectives of Institute of Electrical and Electronics Engineers (IEEE) 802.11be is to make more efficient use of multiple bands and the channels therein. Towards this end, IEEE 802.11be introduces the concept of a Multi-Link Device (MLD), which is the aggregation of multiple physical links (e.g., 2.4 GHz, 5 GHz, and 6 GHz RF bands) into one logical entity. In some examples, the logical entity may include multiple APs (e.g., a multi-AP MLD). This aggregation of multiple physical links into one logical entity provides a seamless roaming opportunity for client devices, also referred to herein as transition transparency. To realize transition transparency, each link of the one logical entity is on a separate AP of the logical entity (e.g., of a multi-AP MLD), where the separate APs are non-collocated in the network separated by Ethernet/IP, for example.

However, tight integration of individual link elements, such as per-Traffic Identifier (TID) frame aggregation (e.g., media access control protocol data unit (MPDU) aggregation) and Block Acknowledgement (B-ACK) functions, into the one logical entity would prevent the separation of the individual link instances of the one logical entity by any appreciable amount of time, especially between non-collocated APs. For example, Wi-Fi is a responsive protocol that requires receipt of an acknowledgment in response to sending of a data transmission within a predefined time period. As one example, the predefined time period is about 9 microseconds (μs). Transmission time itself may consume a majority of this time period, leaving minimal processing time for time-critical steps such as B-ACK generation.

If the links are on separate APs of the logical entity, a B-ACK may be received on a different link of the logical entity from the link on which the data frame was transmitted to a client device. Resultantly, one option may be to implement an architecture comprising a centralized Service Access Point (SAP) that performs the per-TID MPDU aggregation and B-ACK logical functions, including B-ACK computation, for each client device. However, this centralization would leave the SAP with only a few microseconds to compute and return a B-ACK for the appropriate link on another non-collocated AP, which would take an additional transport hop over Ethernet/IP. This clearly limits AP and WLAN transport significantly and is not generally viable because it could not be completed within those few microseconds. Thus, the acknowledgment would not be received within the predefined time period required, and in fact, the delay may be too great to reveal a presence of the non-collocated AP of the logical entity to the client device.

To overcome these deficiencies, embodiments of the disclosure provide an alternative architecture for a multi-AP MLD entity that includes an Upper Service Access Point (U-SAP) and at least two non-collocated APs (e.g., a first AP and a second AP) that each include a Lower Service Access Point (L-SAP), physical (PHY) layer circuitry and (MAC) layer circuitry. To connect to a network, a client device may logically associate with the U-SAP, and physically associate with the two APs on two different links (e.g., a first link and second link). Logical functions of a SAP are split between the U-SAP and the L-SAP of each AP of the multi-AP MLD entity. Specifically, the U-SAP establishes a TID-to link map that assigns non-overlapping subsets of TIDs to each link for use in directing direct data traffic over one of the links, and the L-SAPs of the APs locally perform the per-TID MPDU aggregation and B-ACK functions for the respective subset of TIDs assigned to the link on the AP.

Localization of the per-TID MPDU aggregation and B-ACK functions at the L-SAPs of the APs saves transport time by eliminating transport hops over Ethernet/IP (e.g., eliminating the hop to the centralized SAP and back) enabling an acknowledgment to be generated and received within the predefined time period. Because this architecture of the multi-AP MLD entity makes having each of the links on separate, non-collocated APs now viable, transition transparency may be realized as a seamless roaming opportunity for client devices associated with the multi-AP MLD entity. Thus, a multi-AP MLD entity with this architecture may be said to have transparent transition capabilities.

Additionally, while the WLAN infrastructure has long assisted mobile clients in roaming, conventional methods for assisted roaming typically do not take the client and/or AP capabilities into account. They also innately assume a single link of operation between a client and an AP. The simultaneous transmit and receive operations on multiple links allow MLD capable clients to greatly increase their capacity and also achieve higher throughputs. Thus, MLD capable clients can benefit from being associated to a MLD capable AP such as the multi-AP MLD entity described above. Resultantly, the conventional methods for assisted roaming could potentially lead to undesirable outcomes, including: a MLD client being suggested to roam to a legacy AP (e.g., a non-MLD capable AP), thus reducing its capacity and throughput; and possible disruption in connectivity during a roam, especially when a MLD client is still within coverage area of the serving AP on a different RF band.

Embodiments of the disclosure further describe a roaming assistance scheme that takes into account the capabilities of the client device and the AP, as well as the possibility of having multiple and simultaneous links of operation between the client device and the AP when recommending candidate APs during client roaming. For example, neighboring APs, including MLD capable APs, may be discovered and ranked in a candidate AP list. If the client device is a MLD client, the MLD capable APs may be ranked higher than remaining non-MLD capable APs of the neighboring APs, and the MLD capable APs may then be ranked among one another based on operational RF bands of the MLD capable APs relative to the client device. In some examples, the MLD capable APs may also be ranked based on transparent transition capabilities, such as the transparent transition capabilities of the multi-AP MLD entity described above enabled by the architecture thereof.

Embodiments of the disclosure yet further describe leveraging of the multi-link operation of MLD capable APs and MLD clients to prevent client service disruption during client roaming.

FIG. 1 shows a block diagram of wireless network 100. As shown in FIG. 1, wireless network 100 may comprise a plurality of cells 102 in which a client device 104 may roam. Plurality of cells 102 may have a corresponding plurality of wireless APs that may establish a 802.11 WLAN in order to provide client device 104 network connectivity. While one client device 104 is shown in FIG. 1, a plurality of client devices may be used in conjunction with network 100.

In some examples, site specific policies may be provisioned on a Wireless Local Area Network controller (WLC) 106 for the plurality of APs to join wireless network 100 and to allow WLC 106 to control wireless network 100. In other examples, the network 100 is a controller-less deployment.

Plurality of cells 102 may comprise a first cell 110, a second cell 112, a third cell 114, a fourth cell 116, a fifth cell 118, a sixth cell 120, and a seventh cell 122. First cell 110 may correspond to a first AP 124, second cell 112 may correspond to a second AP 126, third cell 114 may correspond to a third AP 128, fourth cell 116 may correspond to a fourth AP 130, fifth cell 118 may correspond to a fifth AP 132, sixth cell 120 may correspond to a sixth AP 134, and seventh cell 122 may correspond to a seventh AP 136. Thus, the APs are non-collocated, as each of the APs correspond to a different cell of plurality of cells 102. At least two of the non-collocated APs, such as first AP 124 and second AP 126, and a U-SAP 138 may comprise a multi-AP MLD entity 140. In other examples, multi-AP MLD entity 140 may include more than two, non-collocated APs.

Figure 4A:
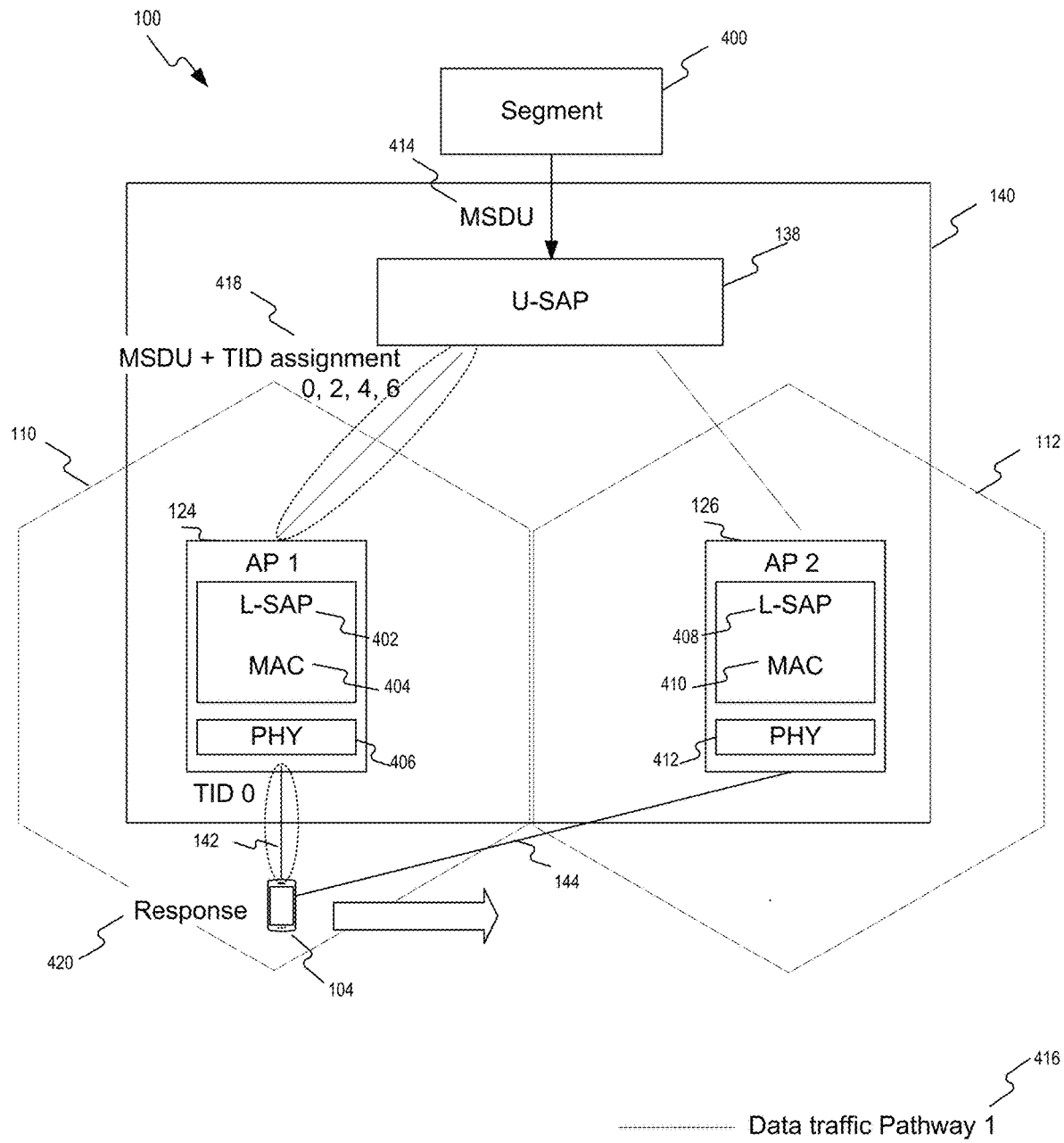
FIGS. 4A and 4B are conceptual diagrams illustrating example seamless roaming for a MLD client.
Figure 4B:
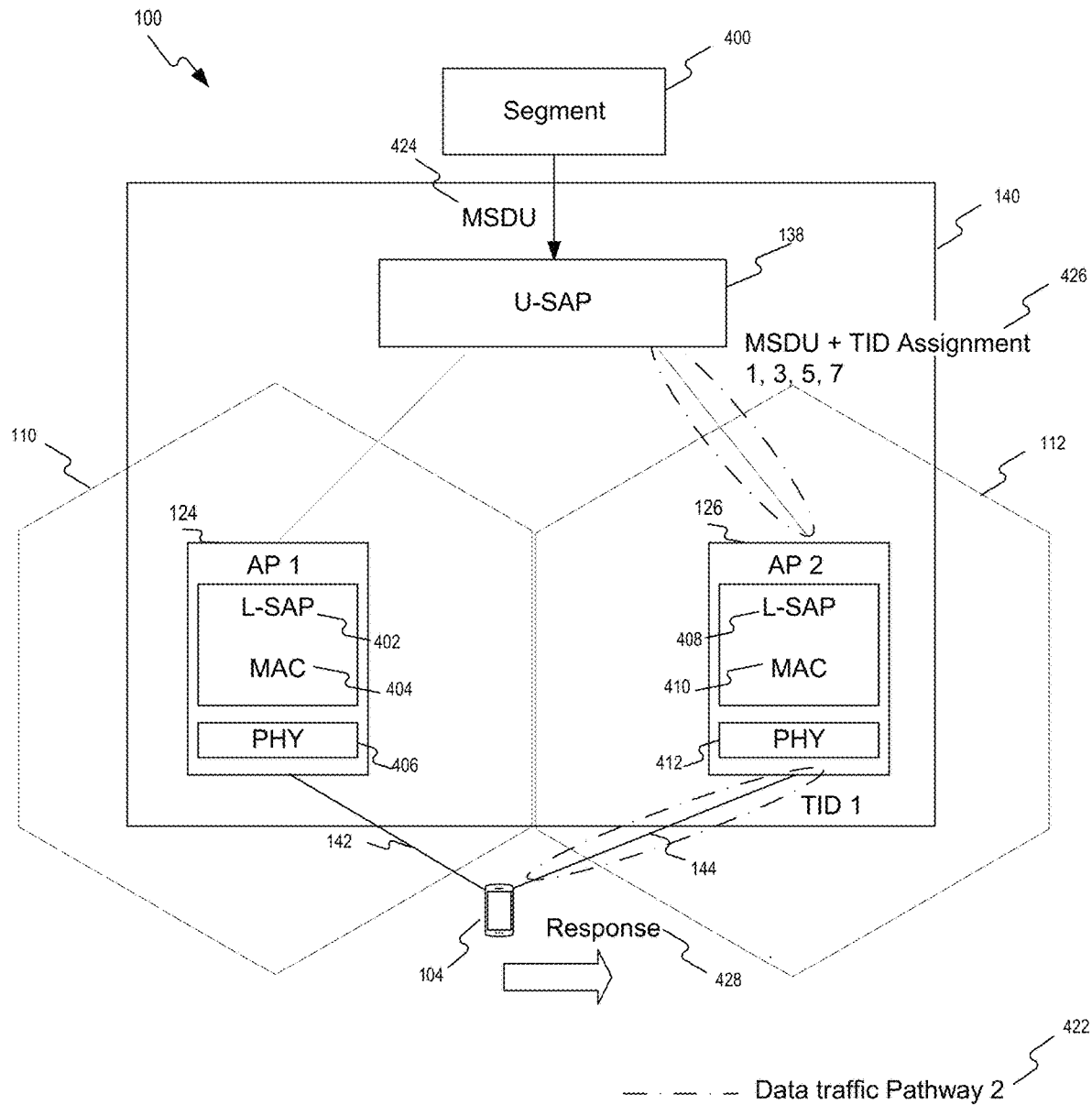

Within multi-AP MLD entity 140, logical functions may be separated between U-SAP 138 and first AP 124 and second AP 126. For example, U-SAP 138 may be recognized as a point of attachment to network 100 for stations associated with multi-AP MLD entity 140 such as client device 104. As a result, U-SAP 138 receives data traffic for the stations transmitted over network 100. In other words, the U-SAP 138 serves as an interface for the stations to Distribution System (DS) of network 100 that distributes such data traffic. U-SAP 138 may also be enabled to establish a TID-to-link map, as described in detail with respect to FIG. 2. Each of first AP 124 and second AP 126 may include an L-SAP, as well as PHY and MAC layer circuitry, as illustrated in FIGS. 4A and 4B. Thus, the L-SAP and MAC/PHY circuitry functionalities for Multi-AP MLD entity 140 may be separated into two physical, non-collocated APs.

Client device 104 may comprise, but is not limited to, a phone, a smartphone, a digital camera, a tablet device, a laptop computer, a personal computer, a mobile device, a sensor, an Internet-of-Things (IoT) device, a cellular base station, a telephone, a remote control device, a set-top box, a digital video recorder, a cable modem, a network computer, a mainframe, a router, or any other similar microcomputer-based device capable of accessing and using a Wi-Fi network or a cellular network.

Client device 104 may be a MLD client. Client device 104 may associate with multi-AP MLD entity 140 using a MLD setup procedure (e.g., a multi-link setup signaling exchange) defined by IEEE 802.11be. As part of the setup, client device may logically associate with U-SAP 138 as well as establish multiple physical links, such as a first link 142 on first AP 124 and a second link on second AP 126. In other examples, more than two links may be established. The links may be communication channels on one of three RF bands: 2.4 Giga-Hertz (GHz), 5 GHz, or 6 GHz. Even though first link 142 is anchored on first AP 124 and second link 144 is anchored on second AP 126, from the perspective of client device 104, client device 104 is associated with a single entity (e.g., multi-AP MLD entity 140) rather than two separate APs.

The separation of logical functions between U-SAP 138 and first AP 124 and second AP 126 enables Multi-AP MLD entity 140 to use the TID-to-link map established by U-SAP 138 to direct different types of data traffic in a DownLink (DL) data transmission to either first AP 124 or second AP 126 for ultimate transmission to client device 104 over first link 142 or second link 144, respectively, where each TID has its own distinct frame aggregation (e.g., MPDU aggregation) and block ACK mechanism that is handled locally by first AP 124 and second AP 126.

In some examples, client device 104 may comprise multiple radios. For example, client device 104 may be a multi-radio MLD client having Simultaneous Transmit Receive (STR) capability (e.g., a multi-radio STR) or a multi-radio MLD client not having STR capability (e.g., a multi-radio non-STR). In other examples, client device 104 may comprise a single radio. For example, client device 104 may be an enhanced single radio MLD client or a single radio MLD client.

MLD capability enables client device 104 to transmit on at least two different links established during multi-link set up. However, based on a type of MLD client that client device 104 is, a number of links on which client device 104 may be active at a same time varies. For example, if client device 104 is an enhanced single radio MLD client or single radio MLD client, client device 104 may only be active on one link at a time and thus, only capable of transmitting data on one link at a time. Alternatively, if client device 104 is a multi-radio STR MLD client or a multi-radio non-STR MLD client, client device 104 may be active on and thus transmit on two different links at the same time. When transmitting on two different links simultaneously, in some examples, client device 104 can transmit on two links within a same RF band (e.g., transmit on two different channels within one of 2.4 GHz, 5 GHz, or 6 GHz bands). In other examples, client device 104 can transmit on two links within different RF bands (e.g., transmit on a channel of 5 GHz band and on a channel of 6 GHz band).

The elements described above of wireless network 100 (e.g., WLC 106, first AP 124, second AP 126, third AP 128, fourth AP 130, fifth AP 132, sixth AP 134, seventh AP 136, U-SAP 138, and multi-AP MLD entity 140) may be practiced in hardware and/or in software (including firmware, resident software, micro-code, etc.) or in any other circuits or systems. The elements of wireless network 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of wireless network 100 may also be practiced using other technologies capable of performing logical operations such as, for example, AND, OR, and NOT, including but not limited to, mechanical, optical, fluidic, and quantum technologies. As described in greater detail below with respect to FIG. 9, the elements of wireless network 100 may be practiced in a computing device 900.

Figure 2:
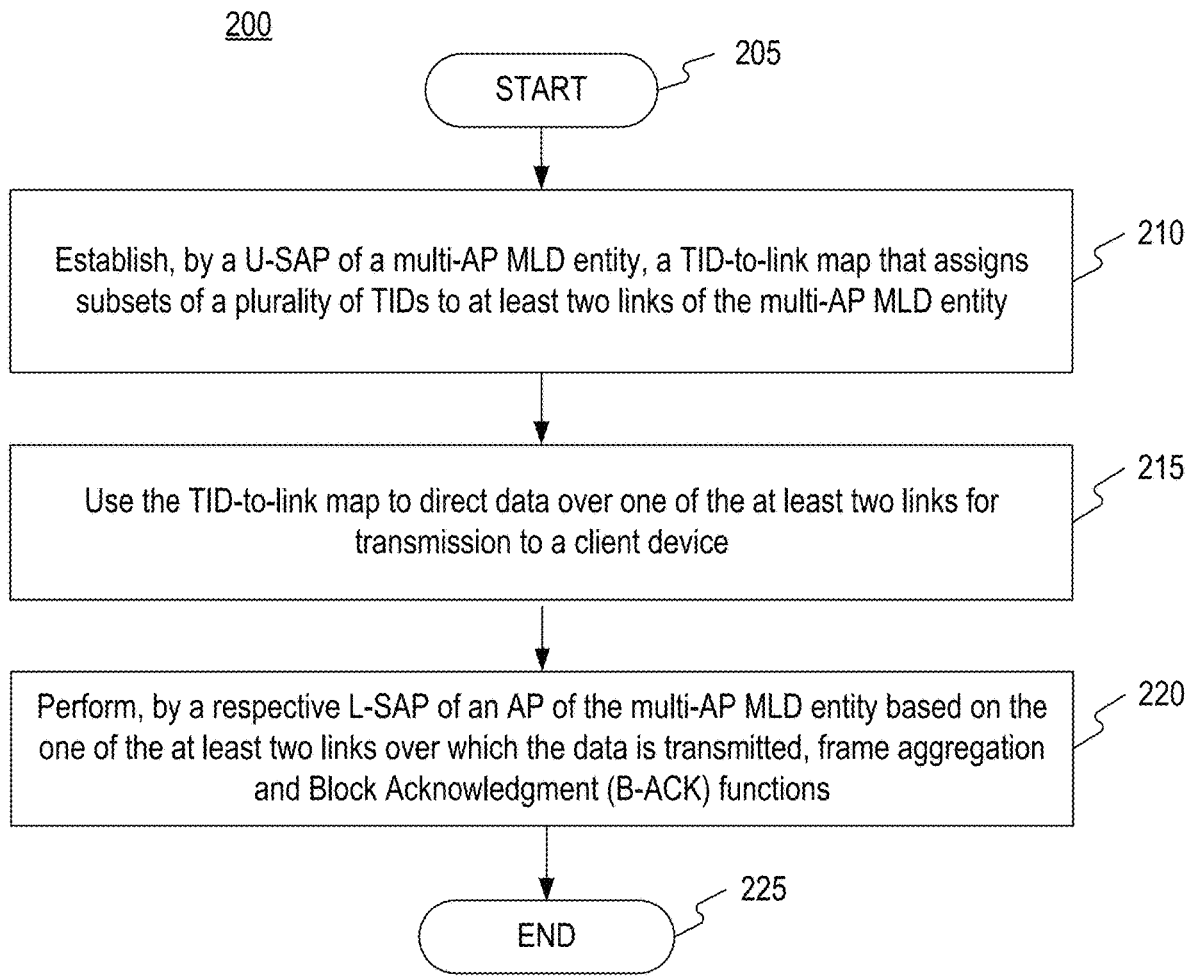
FIG. 2 is a flow chart of a method for establishing a map used for directing data traffic over links of a Multi-Link Device (MLD)

FIG. 2 is a flow chart setting forth the general stages involved in a method 200 consistent with embodiments of the disclosure for establishing a map used for directing data traffic over links of a MLD, such as multi-AP MLD entity 140 described with respect to FIG. 1. Method 200 may be implemented using computing device 900 (e.g., multi-AP MLD entity 140) as described in more detail below with respect to FIG. 9. Ways to implement the stages of method 200 will be described in greater detail below.

Method 200 may begin at starting block 205 and proceed to stage 210 where a TID-to-link map is established by U-SAP 138 of multi-AP MLD entity 140. The TID-to-link map assigns subsets of a plurality of TIDs to at least two links of multi-AP MLD entity 140, such as first link 142 and second link 144. For example, a first subset of the plurality of TIDs is assigned to first link 142, and a second subset of the plurality of TIDs is assigned to second link 144. As described in greater detail below, the subsets may be non-overlapping subsets. For example, if a first TID is in the first subset, the first TID may not be in the second subset.

The plurality of TIDs may be used to classify data frames or packets based on a type of information or data contained therein. In some examples, the plurality of TIDs may include TID pairs associated with one or more access categories (AC) of network 100. As one example, there may be eight TIDs (e.g., 0, 1, 2, 3, 4, 5, 6, and 7) and four ACs, including video, voice, best effort and background. Two of the eight TIDs (e.g., a first TID and a second TID of a TID pair) may be associated with one of the four ACs. For example, TIDs 0 and 1 may be a first TID pair associated with a first AC, TIDs 2 and 3 may be a second TID pair associated with a second AC, TIDs 4 and 5 may be a third TID pair associated with a third AC, and TIDs 6 and 7 may be a fourth TID pair associated with a fourth AC.

The plurality of TIDs may be assigned to the links within the TID-to-link map such that a first TID of a TID pair is assigned to one link and a second TID of the TID pair is assigned to another link. As one example, the first TIDs of one or more of the TID pairs (e.g., TIDs 0, 2, 4, and 6) may be assigned to first link 142, while the second TIDs of the one or more of the TID pairs (e.g., TIDs 1, 3, 5, and 7) may be assigned to second link 144. Accordingly, for each AC, a choice may be made between two different TIDs and thus two different links over which a data frame or packet associated with the respective AC may be transmitted.

Additionally, as a result of this assignment that limits one TID per AC to each of first link 142 and second link 144, per-TID frame aggregation (e.g., MPDU aggregation) and B-ACK functions may be maintained locally by the L-SAPs of first AP 124 and second AP 126, respectively. For example, a first L-SAP of first AP 124 may perform per-TID MPDU aggregation and B-ACK functions for TIDs in the first subset (e.g., TIDS 0, 2, 4, and 6). Similarly, a second L-SAP of second AP 126 may perform per-TID MPDU aggregation and B-ACK functions for TIDs in the second subset (e.g., TIDS 1, 3, 5, and 7). Localization of the per-TID MPDU aggregation and B-ACK functions at the L-SAPs of the APs enables an acknowledgment (e.g., a B-ACK) to be generated and received within the predefined time period that Wi-Fi requires for receipt in response to sending of a data transmission.

From stage 210 where the TID-to-link map is established, method 200 may advance to stage 215 where the TID-to-link map may be used to direct data over one of the at least two links of multi-AP MLD entity 140 for transmission to client device 104. As described in greater detail with respect to FIG. 3 and FIGS. 4A and 4B below, upon selection of a link for DL data transmissions to client device 104, such as first link 142 or second link 144, the TID-to-link map may be used to direct data along a particular pathway (e.g., a particular stack) to cause transmission of the data to client device 104 over the selected link. In some examples, the established TID-to-link map may also be provided to client device 104 for use in UpLink (UL) data transmission.

After the data is transmitted to client device 104 over the selected link (e.g., over one of first link 142 or second link 144), method 200 may proceed to stage 220, where based on the one of the at least two links over which the data is transmitted, a respective L-SAP of an AP of multi-AP MLD entity 140 may perform frame aggregation (e.g., MPDU aggregation) and B-ACK functions. For example, if the data is transmitted to client device 104 over first link 142, first L-SAP of first AP 124 may perform MPDU aggregation and B-ACK functions. Alternatively, if the data is transmitted over second link 144, second L-SAP of second AP 126 may perform MPDU aggregation and B-ACK functions. As previously discussed, localization of frame aggregation and B-ACK functions at the L-SAPs of the APs enables an acknowledgment to be generated and received within the predefined time period that Wi-Fi requires for receipt in response to sending of a data transmission.

Method 200 may then end at stage 225.

Figure 3:
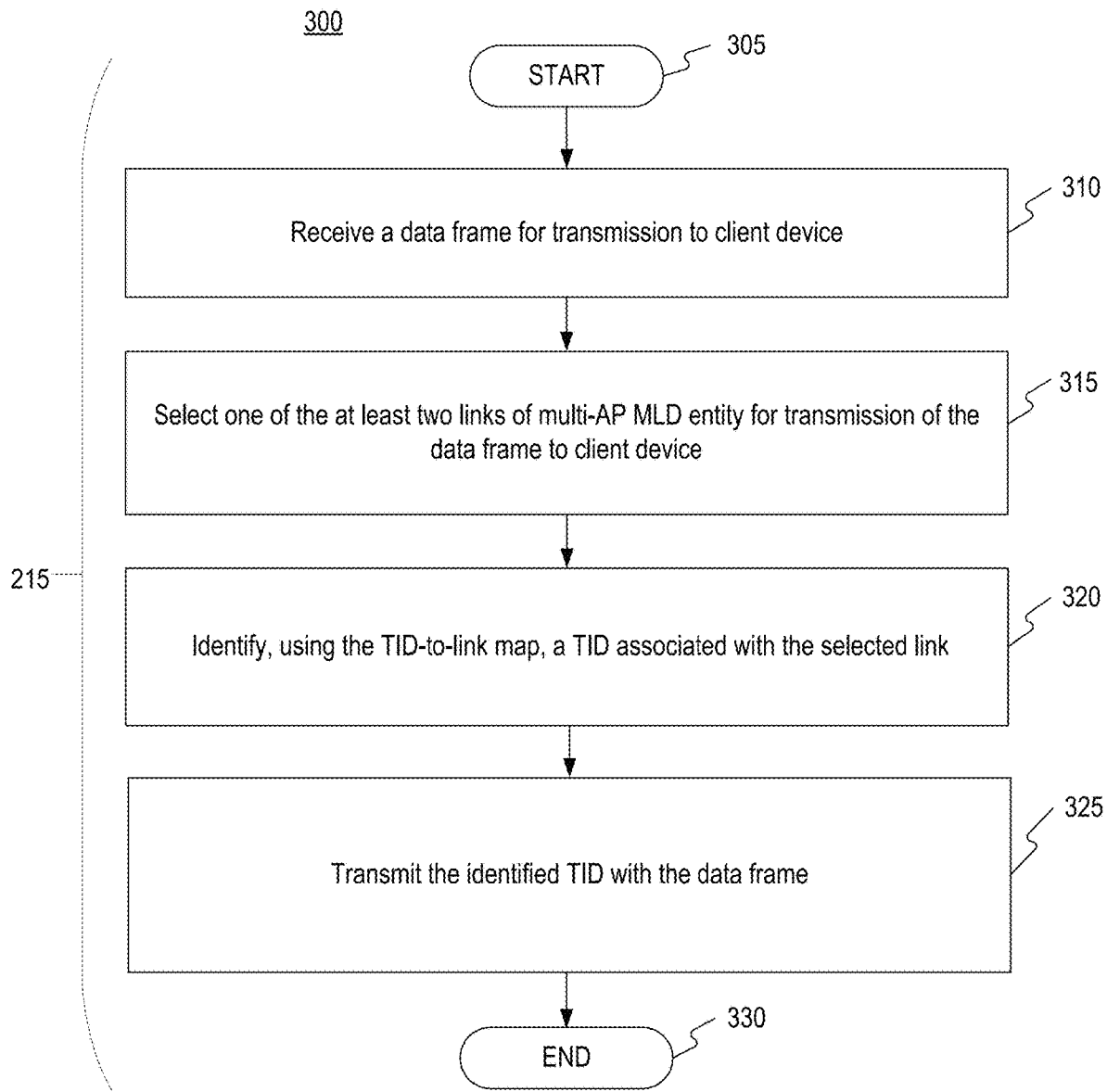
FIG. 3 is a flow chart of a method for directing traffic data over links of the MLD.

FIG. 3 is a flow chart setting forth the general stages involved in a method 300 consistent with embodiments of the disclosure for directing data traffic over links of a MLD, such as multi-AP MLD entity 140 described with respect to FIG. 1. Method 300 may be used to at least partially perform stage 215 of method 200 described with respect to FIG. 2. Method 300 may be implemented using computing device 900 (e.g., U-SAP 138 of multi-AP MLD entity 140) as described in more detail below with respect to FIG. 9. Ways to implement the stages of method 300 will be described in greater detail below.

Method 300 may begin at starting block 305 and proceed to stage 310 where a data frame (e.g., a DownLink Media Access Control Service Data Unit (DL MSDU)) may be received for DL transmission to client device 104. As previously discussed with respect to FIG. 1, upon successful association of client device 104 with Multi-AP MLD entity 140, the DS recognizes U-SAP 138 as the point of attachment of client device 104 to network 100. Therefore, DS distributes data for client device 104 to U-SAP 138. The data frame may be associated with one of the four ACs based on a type of data contained within the data frame.

Once the data frame is received in stage 310, method 300 may continue to stage 315 where one of the at least two links of Multi-AP MLD entity 140 is selected for transmission of the data frame to client device 104. For example, one of first link 142 or second link 144 may be selected. The link selection may be based on a state of the links. For example, whether or not a link is enabled or disabled and a value of the Received Signal Strength Indicator (RSSI) that indicates a channel state quality of the link. The RSSI may be an estimated power level that client device 104 is receiving from AP over the link (e.g., from first AP 124 over first link 142 and from second AP 126 over second link 144). Additionally or alternatively, the link selection may be based on one or more policies associated with cell coverage diversity, area of coverage, load balance among links, and Quality of Service (QOS) parameters, among other similar policies.

After a link is selected in stage 315, method 300 may proceed to stage 320 where a TID associated with the selected link is identified using the TID-to-link map (e.g., the TID-to-link map established in stage 210 described with respect to FIG. 2). Additionally, the TID may be further identified based on which AC the particular data frame is associated with.

Continuing the example introduced in stage 210 described with respect to FIG. 2, if the selected link is first link 142, the TID-to-link map is used to identify that first subset of TIDs (e.g., TIDs 0, 2, 4, and 6) are associated with first link 142. Then, based on whether the data frame is associated with the first, second, third, or fourth AC, one of TID 0, 2, 4, or 6 is respectively identified. Similarly, if the selected link is second link 144, the TID-to-link map is used to identify that the second subset of TIDs (e.g., TIDs 1, 3, 5, and 7) are associated with second link 144. Then based on whether the data frame is associated with the first, second, third, or fourth AC, one of TID 1, 3, 5, and 7 is respectively identified.

After the TID associated with the selected link (and corresponding to the AC of the data frame) is identified in stage 320, method 300 may proceed to stage 325 where the determined TID is transmitted with the data frame (e.g., as a 802.11 MSDU with TID assignment) to direct the data frame along a pathway that results in transmission of the data frame to client device 104 over the selected link. For example, if the first link 142 is selected and the data frame is associated with a first AC, the determined TID may be TID 0, which is transmitted with the data frame along a first pathway to first AP and then from first AP over first link 142 to client device 104.

Client devices, including client device 104, typically are sleeping to conserve power, and only briefly wake up to beacons sent by APs to determine whether any data present for the client device. If there is data present, the client devices may prepare for data transmission, otherwise the client devices may go back to sleep. Thus, before transmitting the data frame, Multi-AP MLD entity 140 may send a Traffic indication map (TIM) within a beacon to client device 104 as an information element. The TIM may include one bit per client device per TID. For example, if the selected link is first link 142, which is associated with TIDS 0, 2, 4, and 6, the TIM sent within the beacon may indicate to client device 104 that Multi-AP MLD entity 140 has traffic on 0, 2, 4, and 6 to prompt the client to communicate with first AP 124 over first link 142 for data transmission. Alternatively, if the selected link is second link 144, which is associated with TIDS 1, 3, 5, and 7, the TIM sent within the beacon may indicate to client device 104 that Multi-AP MLD entity 140 has traffic on TIDS 1, 3, 5, and 7 to prompt the client to communicate with second AP 126 over second link 144 for data transmission. The TIM is sent only once every beacon resulting in low latency requirements and introduces only a small amount of data (e.g., one bit).

Once the determined TID is transmitted with the data frame in stage 325 method 300 may then end at stage 330.

In some examples, following method 300, subsequent data traffic for all ACs may be directed to TIDs associated with the selected link for client device 104, and the other link may remain idle. However, as client device 104 roams across plurality of cells 102, a channel state quality of the selected link may decrease causing performance degradation for client device 104. For example, if first link 142 is the selected link but client device 104 is moving away from first AP 124 towards second AP 126, the channel state quality of first AP 124 may decrease. Resultantly, data traffic for one or more of the ACs may be re-directed to the TIDs associated with the other, non-selected link of Multi-AP MLD entity 140 (e.g., redirect traffic from first link 142 to second link 144). This causes the selected link to become idle and non-selected link to become active. The redirection of traffic is transparent to client device 104 providing a form of seamless roaming, also referred to herein as transition transparency. An illustrative example is provided below in FIGS. 4A and 4B. In addition to the re-direction of traffic, if client device 104 continues to move further away from first AP 124, client device 104 may roam to identify another neighboring AP of network 100 to associate with. Once identified, the first link 142 may be removed, and may be replaced with a link established between client device 104 and the identified neighboring AP.

The above method 300 describes DL data frame transmission from Multi-AP MLD entity 140 to client device 104 that includes link selection and utilization of the TID-to-link map to guide or direct data traffic over the selected link. As previously discussed, the TID-to-link map may be provided by Multi-AP MLD entity 140 to client device 104, and client device 104 may similarly perform link selection and utilize the TID-to-link map to guide or direct data over the selected link for UL data frame transmission from client device 104 to Multi-AP MLD entity 140.

FIGS. 4A and 4B are conceptual diagrams illustrating example seamless roaming for a MLD client, such as client device 104, in network 100. For clarity, only a portion of network 100 is shown in FIGS. 4A and 4B, including a network segment 400. Segment 400 may be an Ethernet segment or an Internet Protocol (IP) network segment. This type of seamless roaming, also referred to herein as transition transparency, may be enabled by the architecture of multi-AP MLD entity 140. Referring concurrently to both FIGS. 4A and 4B, multi-AP MLD entity 140 includes U-SAP 138, first AP 124, and second AP 126. First AP 124 includes a first L-SAP 402, PHY layer circuitry 404, and MAC layer circuitry 406. Second AP 126 includes a second L-SAP 408, PHY layer circuitry 410, and MAC layer circuitry 412. First L-SAP 402, PHY layer circuitry 404, and MAC layer circuitry 406 may be similar to second L-SAP 408, PHY layer circuitry 410, and MAC layer circuitry. First AP 124 and second AP 126 may be non-collocated in network 100. For example, as illustrated, first cell 110 corresponds to first AP 124, whereas second cell 112 corresponds to second AP 126.

As discussed in greater detail with respect to FIG. 1, client device 104 may be a MLD client that is capable of establishing multiple communication links with multi-AP MLD entity 140. For example, first link 142 is anchored on first AP 124 of Multi-AP MLD entity 140 and second link 144 is anchored on second link 144 of multi-AP MLD entity 140. Initially, first link 142 may be active while second link 144 may be idle or on standby. First link 142 may be selected as the active link using the methods described in method 300 with respect to FIG. 3. For example, first link 142 may be selected as the active link based on higher channel state quality of first link 142 as compared to other links of multi-AP MLD entity 140, such as second link 144. The better channel state quality may in part be due to proximate location of client device 104 to first AP 124 within first cell 110 corresponding to first AP 124.

Turning now to FIG. 4A, once data is received at U-SAP 138 from segment 400, the data may be referred to as a MSDU 414. As a result of first link 142 being the active link over which client device 104 receives data, any data received at U-SAP 138 from segment 400, such as MSDU 414, may be directed by U-SAP 138 along a first pathway 416 (e.g., a first stack). First pathway 416 may be defined by the TID-to-link map established by U-SAP 138 as described in detail with respect to FIG. 2 (e.g., stage 210 of method 200). Specifically, a TID per AC is assigned to first link 142 (e.g., TIDs 0, 2, 4, and 6). Thus, when first link 142 is active, U-SAP 138 converts the MSDU 414 to a 802.11 MSDU with a TID assignment 418, where the TID assignment includes one of TIDs 0, 2, 4, or 6 based on an AC of the data in order to direct the data along first pathway 416. As one example, the data may be associated with a first AC, where TIDs 0 and 1 are associated with the first AC. Therefore, when first link 142 is active, TID 0 is assigned, and the data is transmitted along first pathway 416 to client device 104 over first link 142 via first AP 124.

First L-SAP 402 of first AP 124 may be operable to perform per-TID frame aggregation (e.g., MPDU aggregation) prior to sending the data to client device 104. Additionally, upon receiving the data over first link 142, client device 104 may provide a response 420 to acknowledge receipt of the data as part of Wi-Fi's responsive protocol. In some examples, client device 104 may respond with one or more frames associated with a same TID assignment (e.g., TID 0). First L-SAP 402 of first AP 124 may then perform per-TID B-ACK functions. By maintaining these per-TID MPDU aggregation and B-ACK functions locally at first L-SAP 402 of first AP 124 acknowledgments are enable to be generated and received within the predefined time period that Wi-Fi requires for receipt in response to sending of a data transmission.

As client device 104 moves towards an edge of first cell 110 corresponding to first AP 124 and closer to second cell 112 corresponding to second AP 126, for example, a quality of the first link 142 may begin to decrease while a quality of second link 144 may begin to increase. Based on the change in channel state qualities, U-SAP 138 may stop transmitting data to first link 142 via first pathway 416 causing first link 142 to become idle or on standby, while second link 144 becomes active.

Turning now to FIG. 4B, upon selecting the second link 144 to be the active link, U-SAP 138 re-directs data traffic along a second pathway 422 (e.g., a second stack). Similar to first pathway 416, second pathway 422 may be defined by the TID-to-link map established by U-SAP 138 as described in detail with respect to FIG. 2 (e.g., stage 210 of method 200). Specifically, a TID per AC is assigned to second link 144 (e.g., TIDs 1, 3, 5, and 7). Thus, when second link 144 is active, U-SAP 138 converts subsequent data received from segment 400, such as MSDU 424, to a 802.11 MSDU with a TID assignment 426, where the TID assignment includes one of TIDs 1, 3, 5, or 7 based on an AC of the subsequent data in order to direct the subsequent data along second pathway 422. Continuing the above example where TIDs 0 and 1 are associated with the first AC, if the subsequent data received is associated with the first AC when second link 144 is active, TID 1 may be assigned and the data may be transmitted along second pathway 422 to client device 104 over second link 144 via second AP 126.

Second L-SAP 408 of first AP 124 may be operable to perform per-TID frame aggregation (e.g., MPDU aggregation) prior to sending the data to client device 104. Additionally, upon receiving the data over second link 144, client device 104 may provide a response 428 to acknowledge receipt of the data as part of Wi-Fi's responsive protocol. In some examples, client device 104 may respond with one or more frames associated with a same TID assignment (e.g., TID 1). Second L-SAP 408 of second AP 126 may then perform per-TID B-ACK functions. By maintaining these per-TID MPDU aggregation and B-ACK functions locally at second L-SAP 408 of second AP 126, acknowledgments are enable to be generated and received within the predefined time period that Wi-Fi requires for receipt in response to sending of a data transmission.

The re-direction of traffic from first pathway 416 as shown in FIG. 4A to second pathway 422 as shown in FIG. 4B is transparent to client device 104 because, from the perspective of client device 104, it is associated with and is receiving data from a single logical entity, multi-AP MLD entity 140 (e.g., it does not distinguish between first AP 124 and second AP 126). Therefore, transparent transition is enabled (e.g., a form of seamless roaming) from first AP 124 to second AP 126.

Based on continued movements of client device 104 and the direction thereof, first link 142 may be maintained but kept in an idle or standby mode if it appears that client device 104 will move back closer to first cell 110 corresponding to first AP 124. Otherwise, first link 142 may be removed once roaming client device 104 identifies another neighboring AP of network 100 to associate with and establishes a replacement link with the other neighboring AP.

Figure 5:
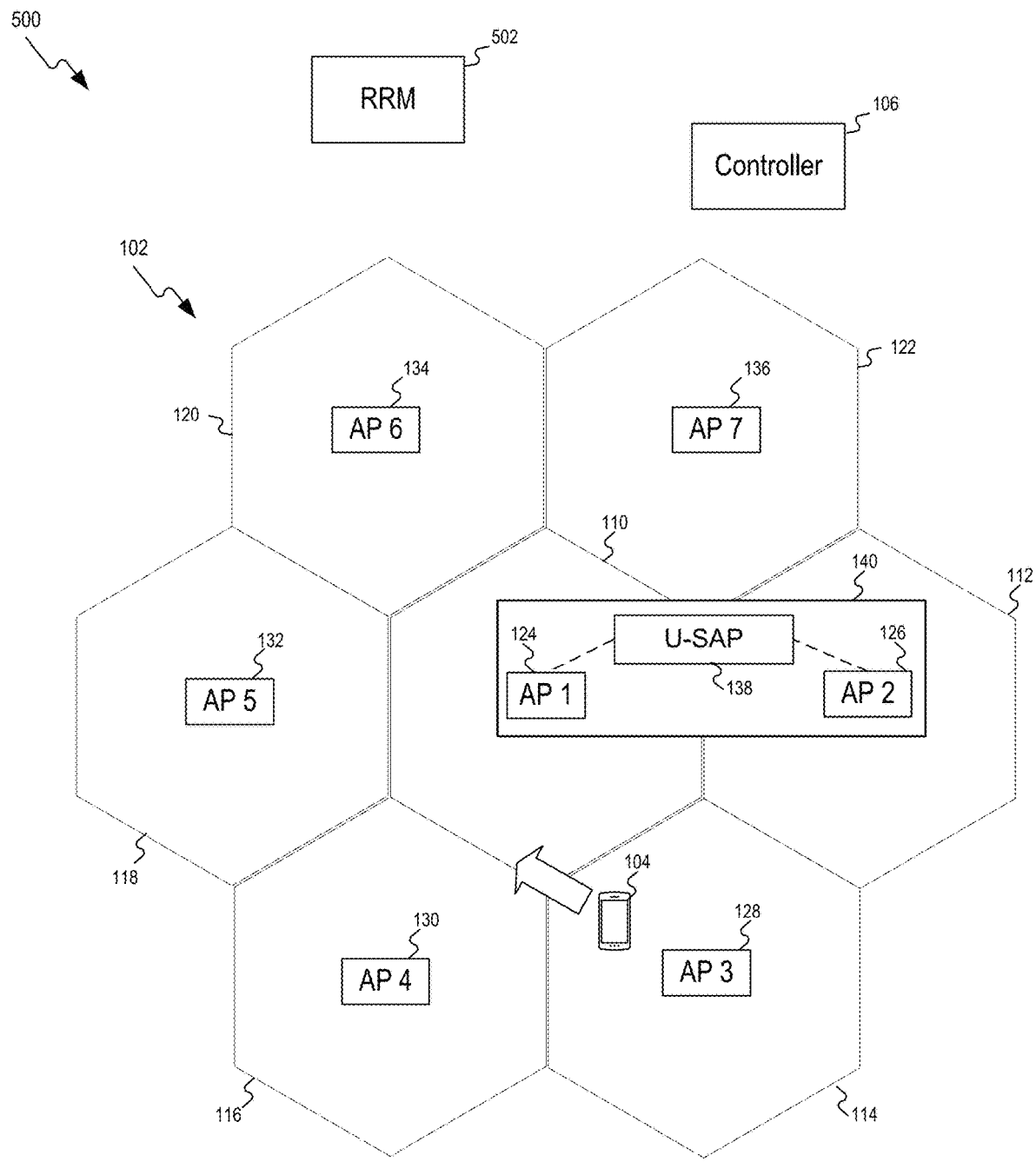
FIG. 5 is another block diagram of wireless network.

FIG. 5 shows a block diagram of wireless network 500. Network 500 is similar to network 100 described with respect to FIG. 1 except that client device 104 is currently associated with third AP 128 (also referred to as a serving AP) that corresponds to third cell 114 of plurality of cells 102. Additionally, network 500 includes Radio Resource Management (RRM) 502.

As previously described, client device 104 may have MLD capabilities that enable multi-link operation between client device 104 and a MLD AP. For example, client device 104 may be capable of transmitting on at least two different links albeit, based on a type of MLD client, only one of the links may be active for transmission at a given time. The two different links may be two different channels of a same RF band (e.g., two channels on one of 2.4, 5, or 6 GHz bands) or a first channel on one RF band and a second channel on another RF band (e.g., first channel on 2.4 Ghz and second channel on 5 GHz). Simultaneous transmit and receive operations on multiple links enable MLD clients to greatly increase their capacity and achieve high throughputs. Thus, MLD clients, such as client device 104, may significantly benefit from being associated with a MLD AP.

As client device 104 begins to move toward edge of third cell 114, client device 104 may begin roaming to identify a next AP to associate with. As part of conventional roaming assistance schemes, a serving AP, such as third AP 128, provides client device 104 with a list of candidate neighboring APs to potentially roam to in order to speed up client device's search for the next AP to associate with, reduce handoff latency, reduce power consumption time by client device 104, and also improve overall air time efficiency. Information from over the air Neighbor Discovery Protocol (NDP) messages used by RRM 502 to understand how each AP sees in RF and how every AP sees other APs in a neighborhood may be used to identify or discover neighboring APs. However, neighboring APs operating in different frequency bands have different coverage characteristics. Thus, conventional NDP messages may only reveal neighboring APs in a subset of the frequency bands. Accordingly, the list of candidate neighboring APs is typically compiled from a list of same RF band AP neighbors of the serving AP. For example, if the serving AP operates on 2.4 GHz and 5 GHz bands, then the other AP neighbors operating on the same RF bands may comprise the list, where ranking within the list may be based on how loud the AP neighbors are or based on estimated location and/or direction of movement of client device 104.

However, these conventional roaming assistance schemes do not account for capabilities of client devices or neighboring APs, such as MLD capabilities allowing multi-link operation or RF band capabilities. As a result, within the list of candidate APs provided by conventional roaming assistance schemes, client device 104 may be suggested to roam to a legacy AP that is not MLD capable causing capacity and throughput of client device 104 to be reduced. Additionally, there may be disruption in connectivity during the roam event, particularly when client device 104 is still within coverage area of the serving AP (e.g., third AP 128) but is within a coverage area of a different RF band from the RF band over which the client device 104 is currently connected to third AP 128.

Embodiments herein describe a roaming assistance scheme to overcome these deficiencies by taking into account MLD capabilities and RF band capabilities of client device 104 and neighboring APs when generating the list of candidate APs to provide to client device 104. Additionally, further embodiments describe leveraging of the multi-link operation of MLD capable APs and clients to prevent client service disruption during client roaming.

Figure 6:
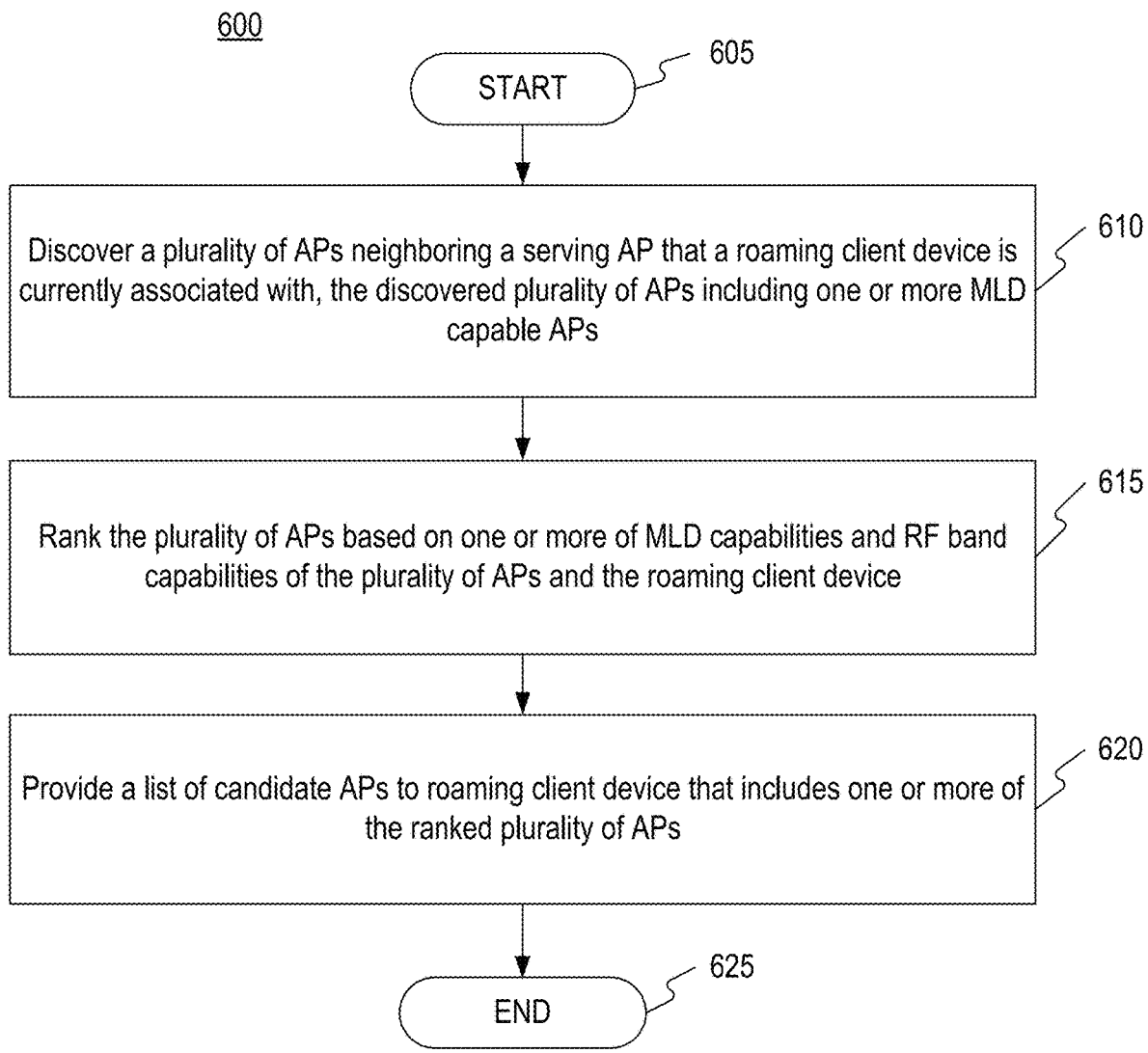
FIG. 6 is a flow chart of a method for assisted roaming.

FIG. 6 is a flow chart setting forth the general stages involved in a method 600 consistent with embodiments of the disclosure for providing assisted roaming for MLD clients, such as client device 104. Method 600 may be implemented using computing device 900 (e.g., third AP 128) as described in more detail below with respect to FIG. 9. Ways to implement the stages of method 600 will be described in greater detail below.

In some examples, method 600 may be initiated in response to receiving a request for a list of neighboring APs from client device 104. Method 600 may begin at starting block 605 and proceed to stage 610 where a plurality of APs neighboring the serving AP, including one or more MLD capable APs, are discovered. Multi-AP MLD entity 140 described in detail above with respect to FIGS. 1-4 may be one example type of MLD capable AP discovered. One or more other neighboring APs may also be discovered as MLD capable APs.

In one example, the NDP messages used by RRM 502 (as described with respect to FIG. 5) may be enhanced to include information about other RF bands and channels thereof that a neighboring AP is operating on. If the information reveals that there is multi-link operation (e.g., operation on either two channels on a same RF band or a channel on each of two different RF bands), then the neighboring AP is discovered as a MLD capable AP. This method of discovery may be particularly suited for controller-less deployments.

In another example, a neighboring AP may be discovered using conventional methods (e.g., using conventional NDP messages), and once discovered infrastructure of network 500 may be leveraged to query for more information about operational RF bands of the discovered neighboring AP in order to determine whether the neighboring AP is MLD capable. This method of discovery may be particularly suited for deployments with a centralized controller, such as WLC 106.

From stage 610 where the plurality of APs neighboring the serving AP are discovered, method 600 may advance to stage 615 where the plurality of APs may be ranked. The ranking may be based on one or more of MLD capabilities and RF band capabilities of the plurality APs and the roaming client device.

For example, when the roaming client device, such as client device 104, is a MLD client, MLD capable APs are ranked higher than remaining non-MLD capable APs of the plurality of APs due to the capacity and throughput benefits gained by MLD clients when associated with a MLD capable AP. Further ranking may then be applied among the MLD capable APs. For example, the MLD capable APs that operate on the most set of RF bands supported by client device 104 may be ranked higher than MLD capable APs who only support a subset of the RF bands. For example, if client device 104 supports operation on 2.4 GHz, 5 GHz, and 6 GHz, then a MLD capable AP that operates on all three RF bands is ranked higher than other MLD capable APs that only operate on two of the three RF bands.

Additionally or alternatively, MLD capable APs operating on a same RF band as the RF band that client device 104 is currently operating on (e.g., link on serving AP (Third AP 128)) may be ranked higher than other MLD capable APs that are not to increase a speed of a hand-off while avoiding a RF band switch. For example, continuing the above example where client device 104 supports operation on 2.4 GHz, 5 GHz, and 6 GHz, client device 104 may be currently operating on 2.4 GHz. Therefore, if both a first and second first MLD capable AP operate on two out of the three bands, but the first MLD capable AP is operating on 2.4 GHz and 5 GHz bands whereas the second MLD capable AP is operating on 5 GHz and 6 GHz bands, then the first MLD capable AP is ranked higher because it is operating on same 2.4 GHz band that client device 104 is currently operating on.

In further examples, transparent transition capabilities of a MLD capable neighboring AP detected as part of discovery in stage 610 may influence ranking. For example, a MLD capable AP having an architecture similar to multi-AP MLD entity 140 described with respect to FIGS. 1-4B may have transparent transition capabilities (e.g., the architecture enables a form of seamless roaming between two non-collated APs of the multi-AP MLD entity). Thus, a MLD capable neighboring AP associated with an architecture similar to multi-AP MLD entity 140 may be ranked higher than other MLD capable neighboring APs having different architectures (e.g., single AP MLDs or conventional multi-AP MLDs) that do not provide transparent transition capabilities.

Figure 8:
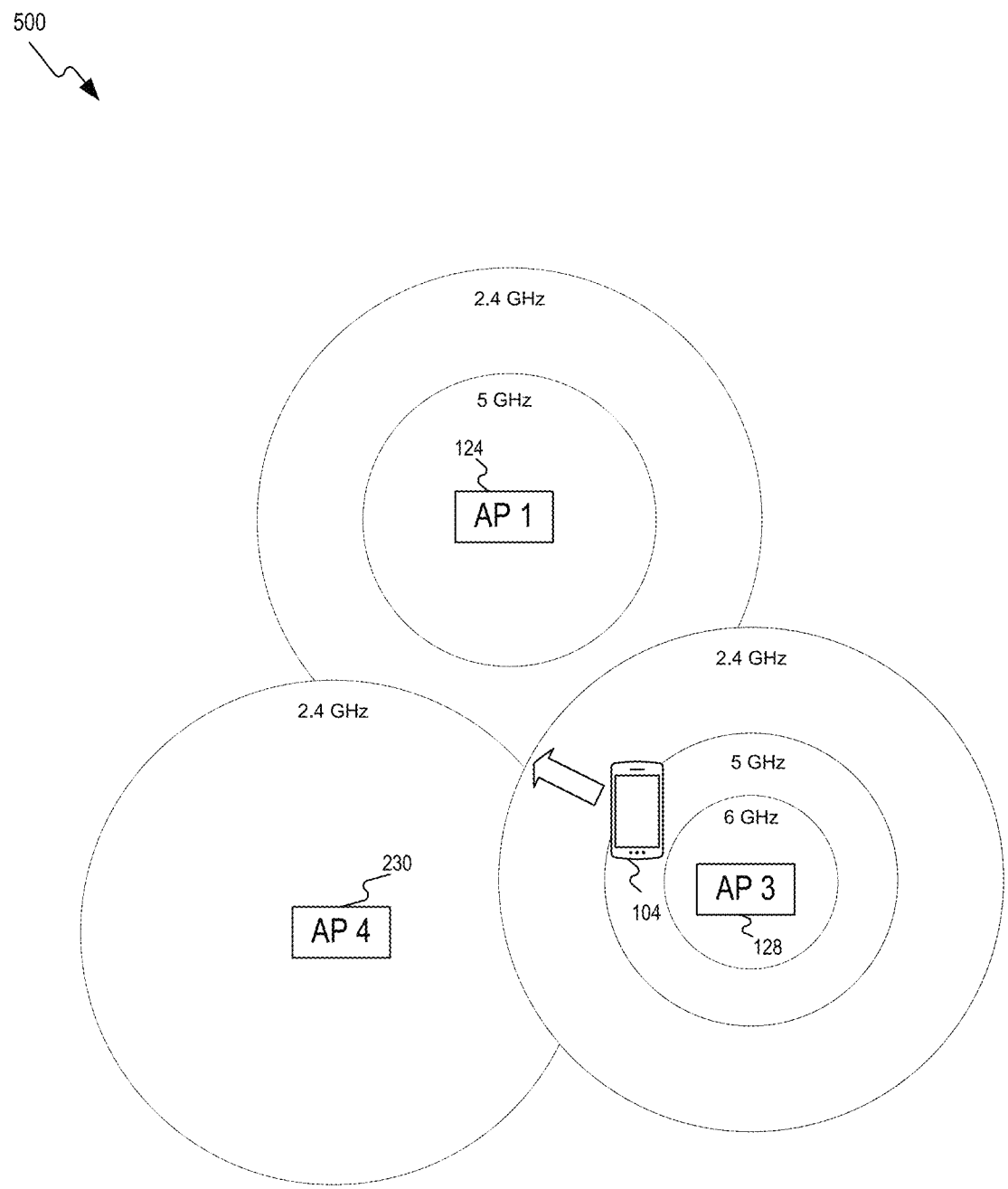
FIG. 8 is a conceptual diagram illustrating assisted roaming.

FIG. 8 below conceptually illustrates an implementation of the ranking mechanisms described in stage 615.

Once the neighboring APs have been ranked in stage 615, method 600 may continue to stage 620 where a list of AP candidates including one or more of the ranked plurality of APs are provided to client device 104. For a MLD capable AP included in the list, information for each of the operational RF bands of the MLD capable AP that are commonly supported by client device 104 are also included within the list. The inclusion of this information for multiple RF bands increases a likelihood of client device 104 hearing the MLD capable AP on at least one of the RF bands prior to client device 104 successfully roaming to the MLD capable AP. Once roamed, a new physical link can be established on any RF band of the MLD capable AP commonly supported by the MLD capable AP and client device 104.

Once the list of AP candidates is provided to client device 104, method 600 may then end at stage 625.

Figure 7:
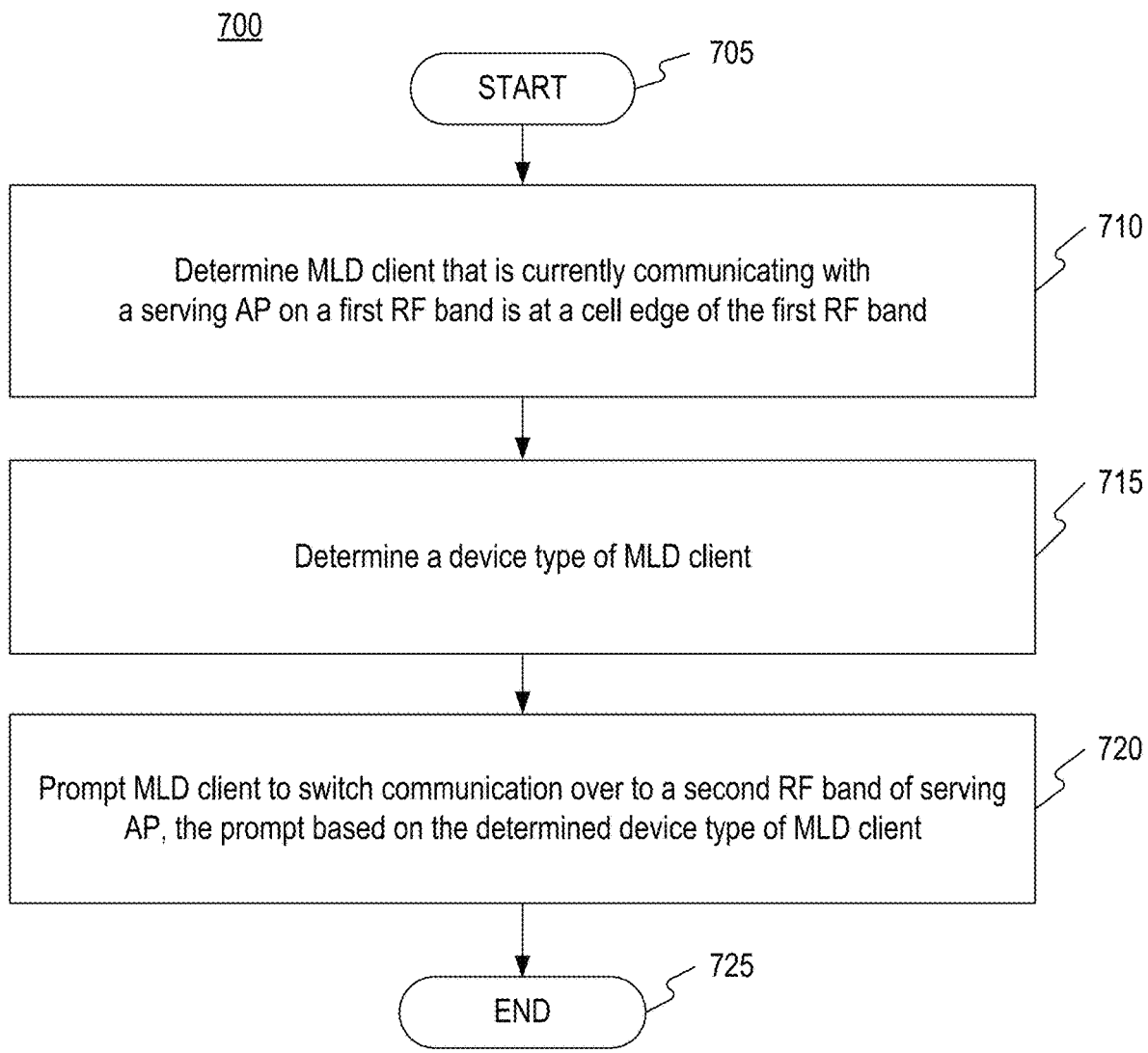
FIG. 7 is a flow chart of a method for preventing service disruption during assisted roaming.

FIG. 7 is a flow chart setting forth the general stages involved in a method 700 consistent with embodiments of the disclosure for leveraging MLD capabilities to prevent service disruption during client roaming. Method 700 may be implemented using computing device 900 (e.g., a serving AP, such as third AP 328) as described in more detail below with respect to FIG. 9. Ways to implement the stages of method 700 will be described in greater detail below.

Method 700 may begin at starting block 705 and proceed to stage 710 where a determination that a MLD client, such as client device 104, that is currently communicating with a serving AP, such as third AP 128, on a first RF band is at a cell edge of the first RF band. As one example, third AP 128 may be an AP MLD that is capable of simultaneously operating at 2.4 GHz, 5 GHz, and 6 GHz bands. As conceptually illustrated in FIG. 8 below, a coverage area for third AP 128 varies between each of the RF bands. For example, the 2.4 GHz band provides a larger coverage area than the 5 GHz and the 6 GHz band, and the 5 GHz band provides a larger coverage area than the 6 GHz band. In one example scenario, the first RF band that client device 104 is communicating with third AP 128 on is the 5 GHz band, and during a roam, client device 104 is determined to be at the cell edge of the 5 GHz band.

From stage 710, where the determination is made that the MLD client is at the cell edge of the first RF band, method 700 may advance to stage 715 where a device type of the MLD client (e.g., client device 104) is determined. The device type may include a multi-radio STR, a multi-radio non-STR, an enhanced single radio, or a single radio, described above with respect to FIG. 1. In some examples, the device type may be determined based on information provided by client device 104 during association with third AP 128 or via other probes received from client device 104.

Once the device type of the MLD client is determined in stage 715, method 700 may continue to stage 720 where the MLD client (e.g., client device 104) is prompted to switch communication over to a second RF band of the serving AP (e.g., second RF band of third AP 128). The second RF band may be a lower frequency band that provides a greater coverage area than the first RF band. Continuing the above example, client device 104 which is currently communicating with third AP 128 on the 5 GHz band may be prompted to switch from the 5 GHz band to the 2.4 GHz band.

Switching from the first RF band to the second RF band that provides greater coverage may ensure that the MLD client remains within a coverage area of the serving AP to prevent service disruption while the now available first RF band of the MLD client attempts to roam to a recommended candidate AP (e.g., a highly ranked candidate AP from the list described in detail with respect to FIG. 6).

In some examples, the type of prompt or manner in which the prompt is provided and/or acted upon may be based on the device type of the MLD client determined in stage 715. As previously discussed, the device type may include a multi-radio STR, a multi-radio non-STR, an enhanced single radio, or a single radio.

If the MLD client is a multi-radio STR, the MLD client may include two or more radios of differing RF bands, where each radio can operate independently of other radios. When a multi-radio STR MLD client is connected to and communicating with the serving AP on a first RF band (e.g., via a higher RF band radio of the MLD client) and is at the cell edge of the first RF band, the MLD client may be prompted to establish and/or, if already established, maintain a connection and begin communicating with the serving AP on a second RF band (e.g., via a lower RF band radio of the MLD client) to avoid service disruption while the higher RF band radio of the MLD client is made available for roaming attempts to the recommended AP candidate. Once the higher RF band radio of the MLD client has successfully roamed to a new AP, the lower RF band radio of the MLD client can also switch over to the new AP.

If the MLD client is a multi-radio non-STR, the MLD client may include two or more radios but, based on hardware constraints, when one radio transmits the other radio may not be able to receive due to power leakage. However, with proper coordination, a multi-radio non-STR MLD client may support simultaneous transmission or reception (e.g., Tx+Tx or Rx+Rx). Thus, when a multi-radio non-STR MLD client is communicating with the serving AP on a first RF band (e.g., via a higher RF band radio of the MLD client) and is at the cell edge of the first RF band, proper transmission and reception cycle coordination between the AP and the MLD client may be provided along with a prompt to the MLD client. The prompt may be to establish and/or, if already established, maintain a connection and begin communicating with the serving AP on the second RF band (e.g., via a lower RF band radio of the MLD client) to avoid service disruption while the higher RF band radio of the MLD client is made available for roaming attempts to the recommended AP candidate. Once the higher RF band radio of the MLD client has successfully roamed to the new AP, the lower RF band radio of the MLD client may also switch over to the new AP.

If the MLD client is an enhanced single radio, the enhanced single radio MLD client may concurrently monitor two links with a single RF chain on each (e.g., assuming a 2×2 radio) while dynamically switching all RF chains to a single link after receiving a Request To Send (RTS) frame or other similar control frame. Initially, the enhanced single radio MLD client may be communicating with the serving AP on a first of the two links, where the first link having a first RF chain corresponds to the first RF band (e.g., a higher frequency band). When the enhanced single radio MLD client is at the cell edge on the first RF band, the enhanced single radio MLD client may be prompted to begin communicating with the serving AP on a second of the two links having a second RF chain that corresponds to the second RF band (e.g., a lower frequency band) to avoid service disruption while enabling the enhanced single radio MLD client to perform a passive scan for the recommended AP candidate using the now available first RF chain. Once a desired control frame or probe is received from the recommended AP candidate, the enhanced single radio MLD client may switch over all RF chains (e.g., the first and second RF chains) to the first link to complete the roam.

If the MLD client is a single radio, the single radio MLD client may establish multiple links to the serving AP during MLD setup, but may only be active on one link at any given time. Initially, the single radio MLD client may be active and communicating with the AP via a first link on a first RF band (e.g., a higher frequency band). When the single radio MLD client is at the cell edge on the first RF band, the single radio MLD client may be prompted to switch over to be active and communicating with the AP via a second link on a second RF band (e.g., a lower frequency band) to avoid service disruption while attempting to roam to the recommended AP candidate using passive and/or active off-channel scanning.

Once the prompt is provided to the MLD client, method 700 may then end at stage 725.

FIG. 8 is a conceptual diagram illustrating assisted roaming for MLD clients, including the leveraging of MLD capabilities to avoid service disruption to MLD client during roaming based on method 600 and 700 described with respect to FIGS. 6 and 7, respectively.

For clarity, only a portion of network 500 described with respect to FIG. 5 is shown, including client device 104, first AP 124, third AP 128 and fourth AP 130. Client device 104 may be a MLD client that is currently associated with third AP 128 (e.g., third AP 128 is the serving AP). Third AP 128 may be a tri-band AP capable of operating on one of three RF bands: 2.4 GHz, 5 GHz, and 6 GHz. As illustrated, a coverage area of the RF bands decreases as a frequency of the RF bands increases. For example, a coverage area decreases from the 2.4 GHz band to the 5 GHz band, and further from the 5 GHz band to the 6 GHz band.

Initially, client device 104 may be communicating with third AP 128 on the 5 GHz band. When client device 104 begins roaming, third AP 128 may assist client device 104 by performing various stages of method 600 described with respect to FIG. 6 in response to receiving a request for neighboring APs from client device 104. For example, neighboring APs may be discovered, including MLD capable APs that may be discovered using enhanced discovery methods described in stage 610 of FIG. 6.

In an example scenario, first AP 124 and third AP 128 may be at least two of the neighboring APs discovered. First AP 124 may be a MLD capable AP that may operate on at least two RF bands simultaneously, such as 2.4 GHz and 5.0 GHz bands. In fact, first AP 124 may be one AP of a multi-AP MLD entity, such as multi-AP MLD entity 140 having the particular architecture and separation of logical functionalities as described with respect to FIGS. 1-4. Fourth AP 130 may be a legacy AP (e.g., a non-MLD capable AP) that is capable of operating on a single RF band, such as a 2.4 GHz band.

Third AP 128 may then rank the neighboring APs in accordance with stage 615 of method 600. For example, because client device 104 is a MLD client, first AP 124 which is MLD capable is ranked higher than fourth AP 130 which is non-MLD capable AP. If one or more other MLD capable APs are discovered in addition to first AP 124, then the MLD capable APs may be further ranked among each other based on a number of RF bands on which the APs operate that are supported by client device and/or based on whether the APs are operating on a same RF band as the RF band that client device 104 is currently operating, as described in detail above with respect to FIG. 6. Moreover, transition capabilities of a MLD capable AP may influence ranking. For example, a MLD capable AP having an architecture similar to multi-AP MLD entity 140 described with respect to FIGS. 1-4B may have transparent transition capabilities enabled by the architecture. Thus, a MLD capable AP having an architecture similar to multi-AP MLD entity 140 may be ranked higher than other MLD capable neighboring APs having different architectures (e.g., single AP MLDs or conventional multi-AP MLDs) that do not provide transparent transition capabilities.

Third AP 128 may then generate a list that includes the ranked neighboring APs and provide the list to client device 104. The list may speed up client device's search for the next AP to associate with, reduce handoff latency, reduce power consumption time by client device 104, and also improve overall air time efficiency. Additionally, the list is generated to account for MLD capabilities and RF band capabilities of the neighboring APs and client device 104 to increase capacity and throughput of client device, as well as increase a speed of a hand-off while avoiding a RF band switch, when possible.

Additionally, at any point during roaming, if third AP 128 detects that client device 104 is at a cell edge of the 5 GHz band, third AP 128 may prompt client device 104 to switch over from the 5 GHz band to the 2.4 GHz band to communicate with third AP 128 to avoid service disruption at client device 104 while roaming. The type of prompt or manner in which the prompt is provided and/or acted upon may be based on a MLD client device type of client device 104, as described in greater detail with respect to FIG. 7.

Figure 9:
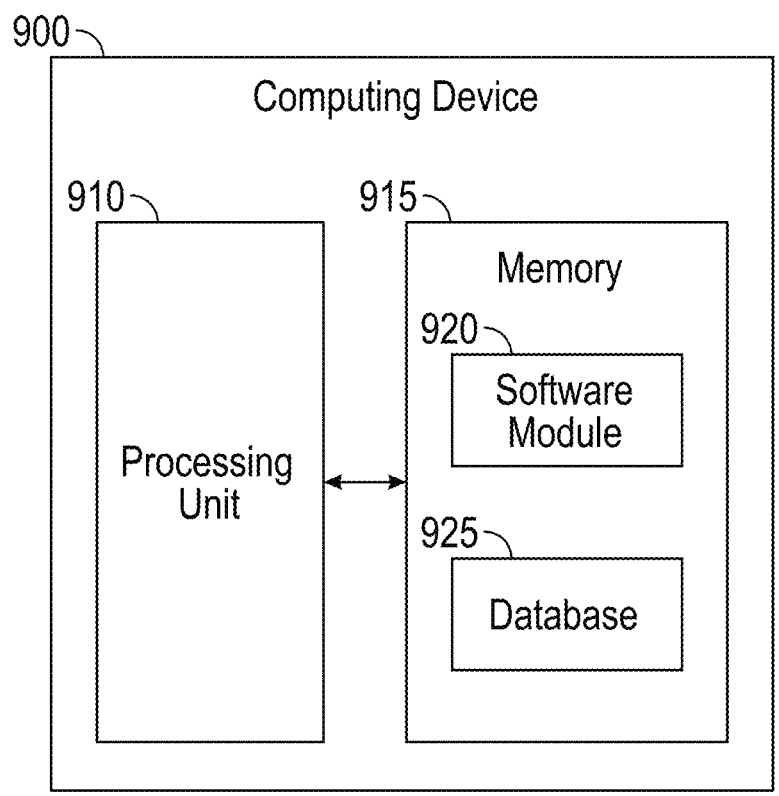
FIG. 9 is a block diagram of a computing device.

FIG. 9 shows computing device 900. As shown in FIG. 9, computing device 900 may include a processing unit 910 and a memory unit 915. Memory unit 915 may include a software module 920 and a database 925. While executing on processing unit 910, software module 920 may perform, for example, processes for establishing a TID-to-link map for use in directing data traffic over a link of a multi-AP MLD entity 140 as described above with respect to FIG. 2, FIG. 3, and FIGS. 4A and 4B and processes for assisted roaming as described above with respect to FIG. 5, FIG. 6, FIG. 7 and FIG. 8. Computing device 900, for example, may provide an operating environment for WLC 106, multi-AP MLD entity 140 (including U-SAP 138, first AP 124, and second AP 126), third AP 128, fourth AP 130, fifth AP 132, sixth AP 134, seventh AP 136 or RRM 502. WLC 106, multi-AP MLD entity 140 (including U-SAP 138, first AP 124, and second AP 126), third AP 128, fourth AP 130, fifth AP 132, sixth AP 134, seventh AP 136 RRM 502 may operate in other environments and are not limited to computing device 900.

Computing device 900 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 900 may comprise any computer operating environment, such as hand-held devices, multiprocessor systems, microprocessor-based or programmable sender electronic devices, minicomputers, mainframe computers, and the like. Computing device 900 may also be practiced in distributed computing environments where tasks are performed by remote processing devices. The aforementioned systems and devices are examples and computing device 900 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 900 on the single integrated circuit (chip).

Embodiments of the present disclosure, for example, are described above with respect to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. An apparatus comprising:
   an Upper Service Access Point (U-SAP) that a client device is logically associated with to connect to a network;
   a first Access Point (AP) that the client device is physically connected to on a first link, the first AP including a first Lower Service Access Point (L-SAP); and
   a second AP that the client device is physically connected to on a second link, the second AP including a second L-SAP;
   wherein the U-SAP is operable to:
      establish a Traffic Identifier (TID)-to-link map that assigns a first subset of a plurality of TIDs to the first link and a second subset of the plurality of TIDs to the second link; and
      use the TID-to-link map to direct data received at the U-SAP over one of the first link and the second link for transmission to the client device; and
   wherein, based on whether the data transmission is over the first link or the second link, the first L-SAP or the second L-SAP is respectively operable to locally perform Block Acknowledgment (B-ACK) functions.

2. The apparatus of claim 1, wherein, based on whether the data transmission is over the first link or the second link, the first L-SAP or the second L-SAP is respectively operable to locally perform frame per-TID frame aggregation functions.

3. The apparatus of claim 1, wherein the B-ACK functions comprise computing and returning a B-ACK to the client device.

4. The apparatus of claim 1, wherein the B-ACK functions comprise receiving, from the client device, an acknowledgement of the data transmission.

5. The apparatus of claim 1, wherein the plurality of TIDs include a TID pair for one or more Access Categories (ACs) of the network, and to establish the TID-to-link map, the U-SAP is further operable to:
   assign a first TID of a TID pair for an AC to the first link; and
   assign a second TID of the TID pair for the AC to the second link.

6. A method comprising:
   establishing, by an Upper Service Access Point (U-SAP) of a multi-Access Point (AP) Multi-Link Device (MLD) entity, a traffic identifier (TID)-to-link map that assigns subsets of a plurality of TIDs to at least two links of the multi-AP MLD entity;
   using the TID-to-link map to direct data received at the U-SAP over one of the at least two links for transmission to a client device; and
   locally performing, by a respective Lower Service Access Point (L-SAP) of an AP of the AP MLD entity based on the one of the at least two links over which the data is transmitted, Block Acknowledgment (B-ACK) functions, wherein:
      the client device logically associates with the U-SAP to connect to a network; and
      the client device is physically connected to at least:
         a first AP of the multi-AP MLD entity on a first link of the at least two links, the first AP comprising a first L-SAP; and
         a second AP of the multi-AP MLD entity on a second link of the at least two links, the second AP comprising a second L-SAP.

7. The method of claim 6, wherein, based on whether the data transmission is over the first link or the second link, the first L-SAP or the second L-SAP is respectively operable to locally perform frame per-TID frame aggregation functions.

8. The method of claim 6, wherein the B-ACK functions comprise computing and returning a B-ACK to the client device.

9. The method of claim 6, wherein the B-ACK functions comprise receiving, from the client device, an acknowledgement of the data transmission.

10. The method of claim 6, wherein the plurality of TIDs include a TID pair for one or more Access Categories (ACs) of the network, and to establish the TID-to-link map, the method further comprising, by the U-SAP:
   assigning a first TID of a TID pair for an AC to the first link; and
   assigning a second TID of the TID pair for the AC to the second link.

11. The method of claim 6, wherein the first AP and the second AP are non-collocated in the network.

* * * * *